United States Patent [19]
Oberg

[11] 3,730,490
[45] May 1, 1973

[54] MOTOR SPEED CONTROL MECHANISM FOR DOMESTIC BLENDER

[75] Inventor: Gustave A. Oberg, Wilmington, Del.
[73] Assignee: Ronson Corporation, Woodbridge, N.J.
[22] Filed: Jan. 11, 1972
[21] Appl. No.: 217,019

[52] U.S. Cl............259/108, 259/DIG. 26, 318/305, 318/349
[51] Int. Cl............................B01f 7/16, B02c 18/12
[58] Field of Search............................318/305, 349; 259/DIG. 26, 108

[56] References Cited

UNITED STATES PATENTS 2,740,029   3/1956   Kueser et al................259/108 X
3,315,946   4/1967   Nissman.........................259/108

Primary Examiner—Robert W. Jenkins
Assistant Examiner—Philip R. Coe
Attorney—Lewis H. Eslinger et al.

[57] ABSTRACT

A speed control member which is linked to a ring on a blender such that rotation of the ring on the blender effects a change of speed of the blender motor. Indicia is imprinted on the blender which indicates to the user the speed chosen for a particular location of the ring.

6 Claims, 3 Drawing Figures

MOTOR SPEED CONTROL MECHANISM FOR DOMESTIC BLENDER

BACKGROUND OF THE INVENTION

The art of domestic blenders and the speed controls therefor has progressed from the point where blenders were used having only one speed. As blender manufacturers became more sophisticated they answered the desire for housewives for a blender having multiple speeds to facilitate various types of food preparation.

Knobs of various sizes and shapes were used on the face of the blender which could be rotated to desired indicia indicating a motor speed. The knobs used to initiate the motor speed modulation were obtrusive, and with time, wear caused the knobs to become loose on the shaft to which they were attached. Since rotation of the shaft effected speed changes, any slippage of the knob would cause an incorrect speed to occur. In other instances the knobs would fall off the shaft completely and be lost.

From knobs, the art progressed to levers which could be axially moved to effectuate the speed change. The problem with a lever, other than it also is an unsightly, obtrusive mechanism, is that it requires an open slot in which to move which leaves a space for foreign matter to collect in the blender housing. The levers are also formed with buttons on the end thereof which tend to loosen and come off leaving an unsightly, protruding arm on the blender.

SUMMARY OF THE INVENTION

Applicant has overcome the aforementioned disadvantages by providing a ring which circumscribes the base of the blender and forms part of the design of the blender. The ring has an internal ridge which functions like a cam in that it moves a hidden, internal arm longitudinally. The arm forms part of a potentiometer which varies the voltage impressed across the terminals of an electric motor so as to control the speed of the motor. Indicia is placed on the blender base and on the ring so the user can turn the ring to the desired motor speed.

DESCRIPTION OF THE PREFERRED EMBODIMENT

Figure 1:
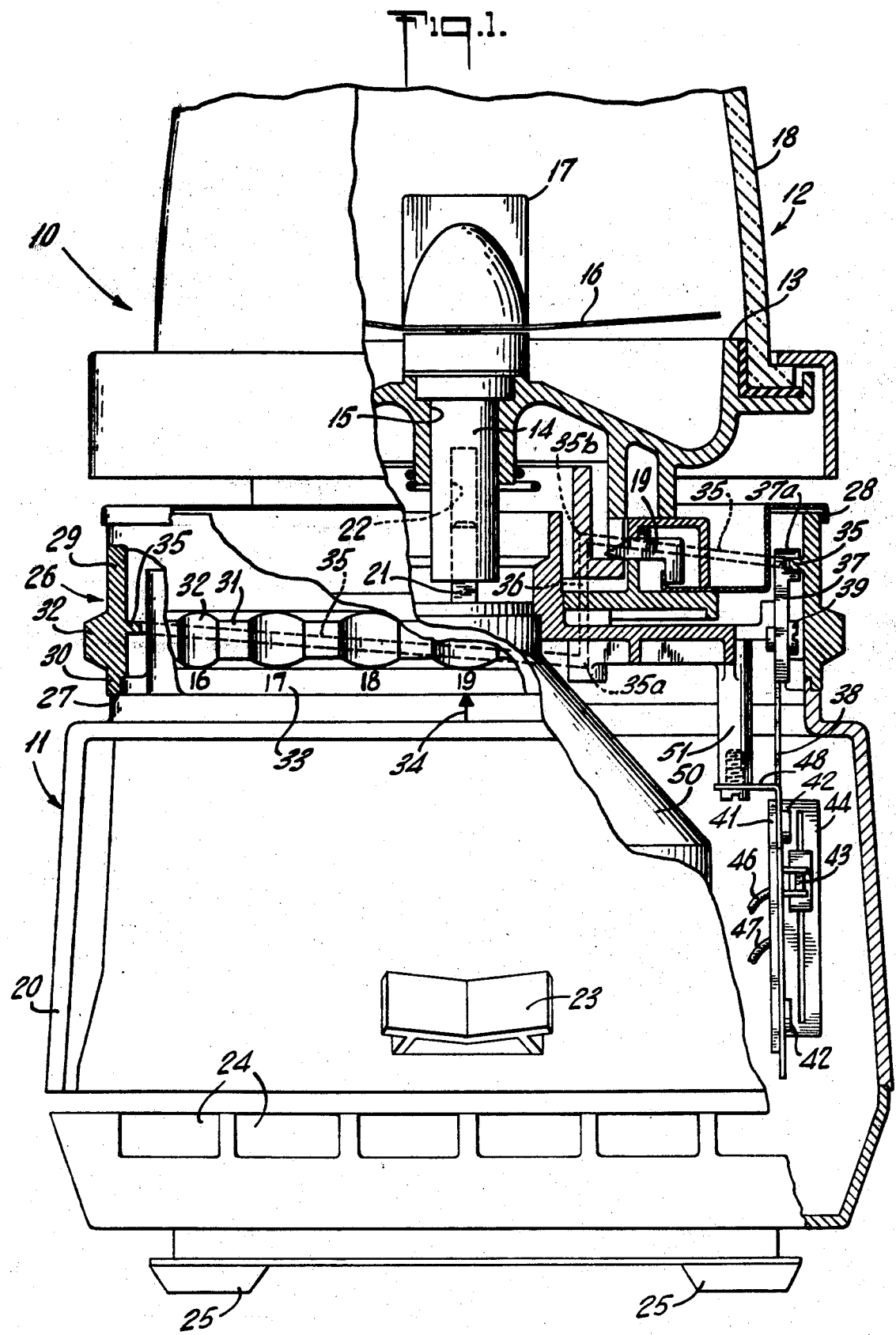
FIG. 1 is a front view in elevation partially in section.
Figure 2:
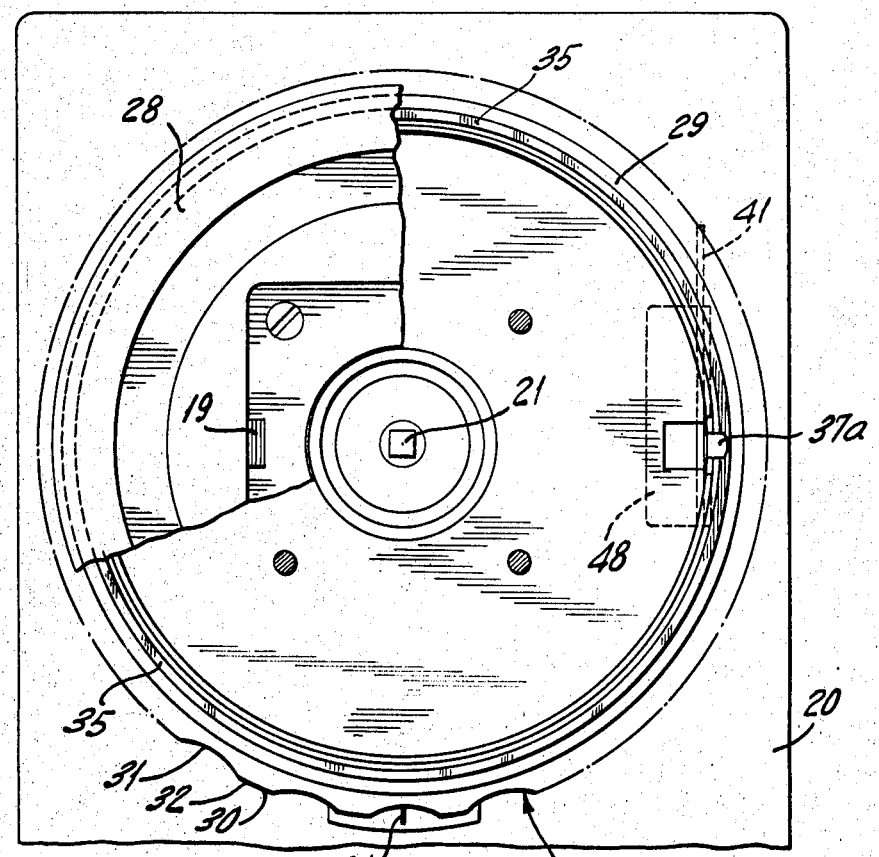
FIG. 2 is a top plan view of the base partially cut away.

Referring to FIG. 1, there is shown a blender 10 which is a portable, domestic appliance used to comminute food. The blender generally includes a base 11 and a jar 12. The jar 12 includes a generally cup-shaped base 13 which is designed to retain food therein. A shaft 14 is rotatably mounted in an opening 15 in the base and a set of blender blades 16 are secured to said shaft for rotation therewith. A nut 17 is removably screwed on the shaft 14 and retains the blades on the shaft. A detailed description of the nut 17 and the blades is given in U.S. Pat. No. 3,315,946 entitled "Mixing and Blending Device" which issued on Apr. 25, 1967. Secured to the cup-shaped base 13 is an enclosure 18 in the form of a jar which can be glass, plastic or metal and is removably secured to the base 13 by any known clamping means such as disclosed in U.S. Pat. No. 3,315,946. The container can be closed at its mouth by a cover (not shown) which prevents the contents from being thrown from the container. The jar portion 12 of the blender is held upon the cup base 13 and any known removable locking mechanism such as the slidable pin 19 can be used to secure the jar 12 to the motor base 11. The base has a motor 50 shown schematically in FIG. 3 mounted within the base housing 20. The drive shaft 21 which can be splined, square or D-shaped is inserted into a socket 22 in the blade driving shaft 14. An on-off switch 23 is used to energize and deenergize the driving motor. The housing can have vents 24 at the lower portion thereof which provides a means to provide a source of cooling air to the motor. A plurality of cushioned feet 25 which are preferably four in number serve to support the blender 10.

A speed control ring 26 surrounds the upper portion of the base 11 and is supported on an annular shoulder 27 so as to be freely rotatable thereon with a slight friction fit. A drip ring 28 functions to prevent liquid from dropping into the motor housing 11 and also functions to maintain the speed control ring 26 in position on the blender. The ring 26 includes an inner ring 29 and an outer ring 30 formed with a plurality of spaced indentations 31 therein. The indentations are wide enough to accommodate the finger of an operator. Directly beneath the portion 32 which separates each indentation is indicia 33 which can appear in the form of numbers referring to a motor speed. A fixed point is represented by an arrow 34 on the base 11. Thus, the ring 26 is rotatable with respect to the fixed arrow 34 whereby the user can dial a desired speed by simply rotating the ring 26 having the indicia 33 thereon until the desired number is adjacent the arrow 34.

The inner ring 29 has an internal cam 35 formed therein. The cam 35 starts at a low portion 35a which gradually rises upwardly to a point 35b on the inner ring. The upper and lower points 35a and 35b are interconnected by a vertical connector 36 which functions as a stop to limit rotational movement of the ring in both clockwise and counterclockwise directions. The gradual rise of the cam 35 corresponds to a gradual increase or decrease of motor speed depending on the polarity of the potentiometer.

Figure 3:
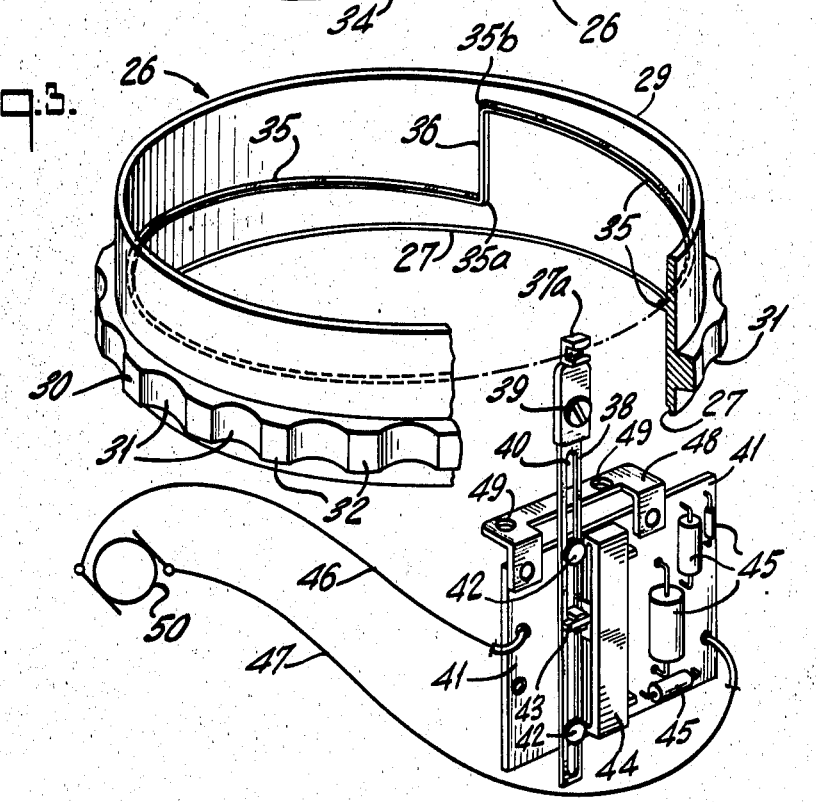
FIG. 3 is a perspective view of the ring and potentiometer.

A cam follower 37 which is in the form of a U-shaped member 37a is dimensioned to fit over the cam 35 in a relatively loose fashion so the cam can move the follower readily. The cam follower is attached to an arm 38 by a screw 39 or any other known fastener. The arm 38 has a longitudinal slot 40 therein. The arm is movably secured to a circuit board 41 which holds the arm 40 thereon by means of pins 42 having enlarged heads which extend beyond the confines of the slot 40. An electrical contact 43 is secured to the arm 38 and is therefore movable therewith. The contact 43 engages copper windings (not shown) which are wound within the potentiometer housing 44 secured to the circuit board 41. Electrical components 45 such as resistors or solid state devices can be secured to the circuit board 41 and wired into the motor circuit in known manner. The electrical leads from the windings in the potentiometer housing 44 are wired into the board circuit in known manner. Electrical leads 46, 47 are wired into the board 41 circuit such that a plurality of voltages can be placed across the leads 46, 47 in accordance with the position of the contact 43 on the potentiometer winding. An L-shaped bracket 48 which can be riveted to the circuit board 41 has openings 49 therein which enables the bracket to be secured to a post 51 from the base 11 of the blender 10. The motor 50 is schematically shown in FIG. 3 which is connected to the leads 46, 47 through conventional brushes (not shown).

In actual operation, the user fills the container 18 with the desired food elements and places the container on the base 11 such that the drive shaft 21 mates with the socket 22 in the driven blade shaft 14. The user then determines which motor speed is best to perform the operation on the food elements. The speed can be determined from a booklet or the information can be written on the ring 26 itself adjacent the numbers 33 appearing thereon. For example, blending ingredients for a soup would be indicated as a relatively slow speed such as "4". If the user desires to whip potatoes a higher speed would be indicated by a numeral such as "18" for example. The user merely rotates the dial 26 so that the desired motor speed indicia 33 is in alignment with the fixed arrow 34 on the blender base. As the dial 26 is rotated, the cam follower follows the cam 35 and is either raised or lowered depending on the direction of rotation. The arm 38 which is secured to the follower 37 is thereby moved longitudinally up or down, and the contact 43, which wipes the windings in the potentiometer, varies the voltage to the motor in accordance with its location on the potentiometer windings in a known manner. The interconnecting member 36 serves to limit the rotational movement of the ring 26.

It will now be readily appreciated that applicant has provided a simple speed adjusting mechanism which overcomes all the disadvantages of the prior art blenders. There is no knob which can become loose or lost; there is no obtrusive member on the blender which detracts from the design; no lever is necessary whereby the aforementioned disadvantages occur and no slot is necessary using applicant's unique concept; there are no buttons associated with the ring, as on a lever, which can become loose or lost.

While there has been shown and described a particular embodiment of this invention, it will be obvious to those skilled in the art that various changes and modifications can be made therein without departing from the invention, and therefore, it is intended in the appended claims to cover all such changes.

I claim:
1. In a blender, a mechanism for varying the speed of a motor comprising,
   a. a blender base which supports and houses the mechanism for varying the speed of a motor,
   b. a motor mounted within said housing and a drive shaft extending out of said motor,
   c. a blender jar on said base and a driven shaft having blades secured thereto extending from said blender jar which mates with said drive shaft to be driven thereby,
   d. a circular member rotatably mounted on said base surrounding said drive shaft and said driven shaft,
   e. a motor speed control means secured to said base which is wired so as to provide variable voltages across the motor,
   f. actuating means secured to said circular member which actuates the motor speed control means and varies the voltage across the motor upon rotation of said circular member.

2. A blender as defined in claim 1 further comprising indicia which is printed on the circular member and cooperating indicia which appears on the base whereby the user can rotate the circular member to a desired position with respect to the base and effect a desired motor speed.

3. A blender as defined in claim 1 in which the circular member comprises an inner ring and an outer ring secured thereto in which the outer ring has spaced indentations thereon.

4. A blender as defined in claim 1 in which the motor speed control means comprises a potentiometer having circuitry wired into the motor circuit and a longitudinally movable arm having a contact thereon which abuts against the potentiometer circuitry to effect a variable voltage across the motor terminals.

5. A blender as defined in claim 1 in which the actuating means comprises an internal cam fixed to said circular member and serves to actuate the motor speed control means.

6. A blender as defined in claim 5 in which said cam begins at a low point on said circular member and gradually rises to a higher point on said circular member and said high and low points on said cam are joined by a connecting member which limits the rotational movement of said circular member.

* * * * *